United States Patent [19]

Date

[11] Patent Number: 5,553,053
[45] Date of Patent: Sep. 3, 1996

[54] OPTICAL DISK DEVICE INCLUDING A SUPPORT MEMBER FOR MOVABLY SUPPORTING AN OBJECTIVE LENS IN FOCUSING AND RADIAL DIRECTIONS WITH RESPECT TO AN OPTICAL DISK AND A DETECTING DEVICE FOR DETECTING A POSITION OF THE OBJECTIVE LENS

[75] Inventor: Nobuaki Date, Kawasaki, Japan

[73] Assignee: Canon Kabushiki Kaisha, Tokyo, Japan

[21] Appl. No.: 477,644

[22] Filed: Jun. 7, 1995

Related U.S. Application Data

[62] Division of Ser. No. 275,659, Jul. 15, 1994, Pat. No. 5,450,386, which is a continuation of Ser. No. 857,841, Mar. 26, 1992, abandoned.

[30] Foreign Application Priority Data

| Apr. 5, 1991 | [JP] | Japan | 3-100506 |
| Apr. 5, 1991 | [JP] | Japan | 3-100507 |
| Apr. 5, 1991 | [JP] | Japan | 3-100508 |
| Jun. 25, 1991 | [JP] | Japan | 3-178897 |

[51] Int. Cl.⁶ ............................. G11B 7/00
[52] U.S. Cl. .................... 369/112; 369/117
[58] Field of Search ............. 369/44.14, 44.23, 369/44.24, 48, 112, 44.34, 32, 44.21, 117, 118, 120, 121

[56] References Cited

U.S. PATENT DOCUMENTS

| 4,538,882 | 9/1985 | Tanaka et al. | 350/255 |
| 4,754,446 | 6/1988 | Reno | 369/112 |
| 4,761,774 | 8/1988 | Ishibashi et al. | 369/44.14 |
| 4,956,833 | 9/1990 | Kokado et al. | 369/112 |
| 4,984,226 | 1/1991 | Kobori | 369/13 |
| 5,001,694 | 3/1991 | Lee et al. | 369/112 |
| 5,008,876 | 4/1991 | Nakagishi | 369/244 |
| 5,029,150 | 7/1991 | Kiyoshi | 369/48 |
| 5,103,345 | 4/1992 | Watanabe et al. | 359/813 |
| 5,126,983 | 6/1992 | Ikegame et al. | 369/13 |
| 5,157,642 | 10/1992 | Tsukamura et al. | 369/44.34 |
| 5,187,702 | 2/1993 | Takahashi | 369/215 |
| 5,195,074 | 3/1993 | Tanoshima et al. | 369/48 |
| 5,208,703 | 5/1993 | Ikegame et al. | 359/813 |
| 5,216,648 | 6/1993 | Noda et al. | 369/44.14 |
| 5,228,017 | 7/1993 | Matsuzaki et al. | 369/44.15 |
| 5,278,813 | 1/1994 | Ohnishi et al. | 369/112 |

FOREIGN PATENT DOCUMENTS

| 362333 | 3/1981 | Japan . |
| 61-160843 | 7/1986 | Japan . |
| 62-31038 | 2/1987 | Japan . |
| 62-125544 | 6/1987 | Japan . |
| 62-246152 | 10/1987 | Japan . |
| 63-124232 | 5/1988 | Japan . |
| 63-119026 | 5/1988 | Japan . |
| 258735 | 2/1990 | Japan . |
| 2301029 | 12/1990 | Japan . |

*Primary Examiner*—Nabil Z. Hindi
*Attorney, Agent, or Firm*—Fitzpatrick, Cella, Harper & Scinto

[57] ABSTRACT

An optical disk device includes a light source, an objective lens, a box body and a supporting member. The light source is provided so as not to move to the apparatus body. The box body holds the objective lens. The box body is supported movably to the apparatus body in the tracking, focusing and seek directions by the supporting member. Light beam emitted from the light source is guided to the objective lens by the mirror.

5 Claims, 9 Drawing Sheets

5,553,053

OPTICAL DISK DEVICE INCLUDING A SUPPORT MEMBER FOR MOVABLY SUPPORTING AN OBJECTIVE LENS IN FOCUSING AND RADIAL DIRECTIONS WITH RESPECT TO AN OPTICAL DISK AND A DETECTING DEVICE FOR DETECTING A POSITION OF THE OBJECTIVE LENS

This application is a divisional of application Ser. No. 08/275,659 filed Jul. 15, 1994 now U.S. Pat. No. 5,450,386, which application is a continuation of prior application, Ser. No. 07/857,841 filed Mar. 26, 1992, now abandoned.

BACKGROUND OF THE INVENTION

1. Field of the Invention

The present invention relates to an optical disk device arranged such that a separation type optical head is used, which includes a fixed optical head and a movable optical head, and the movable optical head is driven in radial directions of a disk by a linear motor.

2. Related Background Art

A typical conventional optomagnetic disk device as a storage device exhibits such an advantage that the capacity is larger than that of a hard disk device, but has such a defect in that response speed during information accessing is slow. This defect is derived from the fact that the optical head of the optomagnetic disk device is heavier than the magnetic head of the hard disk device, and a sufficient acceleration for speeding up accessing cannot be obtained. To cope with this, a so-called separation type optical head has been proposed, wherein, for obtaining a light-weight optical head, the optical head is separated into a fixed optical head unit including a laser light source and sensors and into a movable optical head unit including a mirror and a lens actuator to thereby reduce the weight of the movable optical head unit.

Further, for obtaining a much-lighter-weight optical head, a system also has been proposed, wherein fine tracking based on a galvano-mirror and a seek operation based on a linear motor are combined. In this system, a carriage of the movable optical head unit is restrained to approximately 6–7 grams, and the weight is considerably small. However, because of a double structure for mounting a focusing lens actuator on the carriage, the reduction in weight is not necessarily sufficient.

As described above, the conventional separation type optical head is separated into the fixed optical head unit and the movable optical head to remarkably reduce the weight of the movable optical head. However, the movable optical head unit is typically a combination of the carriage for performing the seek operation and the lens actuator for effecting the tracking/focusing operations. The movable optical head unit has a weight of approximately several tens of grams. Hence, there inevitably arises a defect that the acceleration of the hard disk device is not attained at all, and the response speed is slow.

SUMMARY OF THE INVENTION

It is an object of the present invention, which improves the problems inherent in the above-described conventional separation type optical head, to provide an optical disk device capable of increasing an access response speed by extremely reducing the weight of a movable optical head unit while supporting a lens actuator on a device body so that all of the seek/tracking/focusing operations can be performed by the single lens actuator.

To accomplish the object given above, according to one aspect of the present invention, in an optical disk device using a separation type optical head, there is provided an optical disk device in which a lens actuator, including an objective lens and a diverting mirror, is supported on a device mount so that the seek/tracking/focusing operations are executable from an inner periphery to an outer periphery of a disk.

In the thus constructed optical disk device, the diverting mirror which has hitherto been disposed on a carriage is disposed within the lens actuator to not use the carriage. It is therefore possible to extremely decrease the weight of the movable unit of the optical head and to increase the access response speed.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENTS

The present invention will be described in detail by way of illustrative embodiments.

Figure 1:
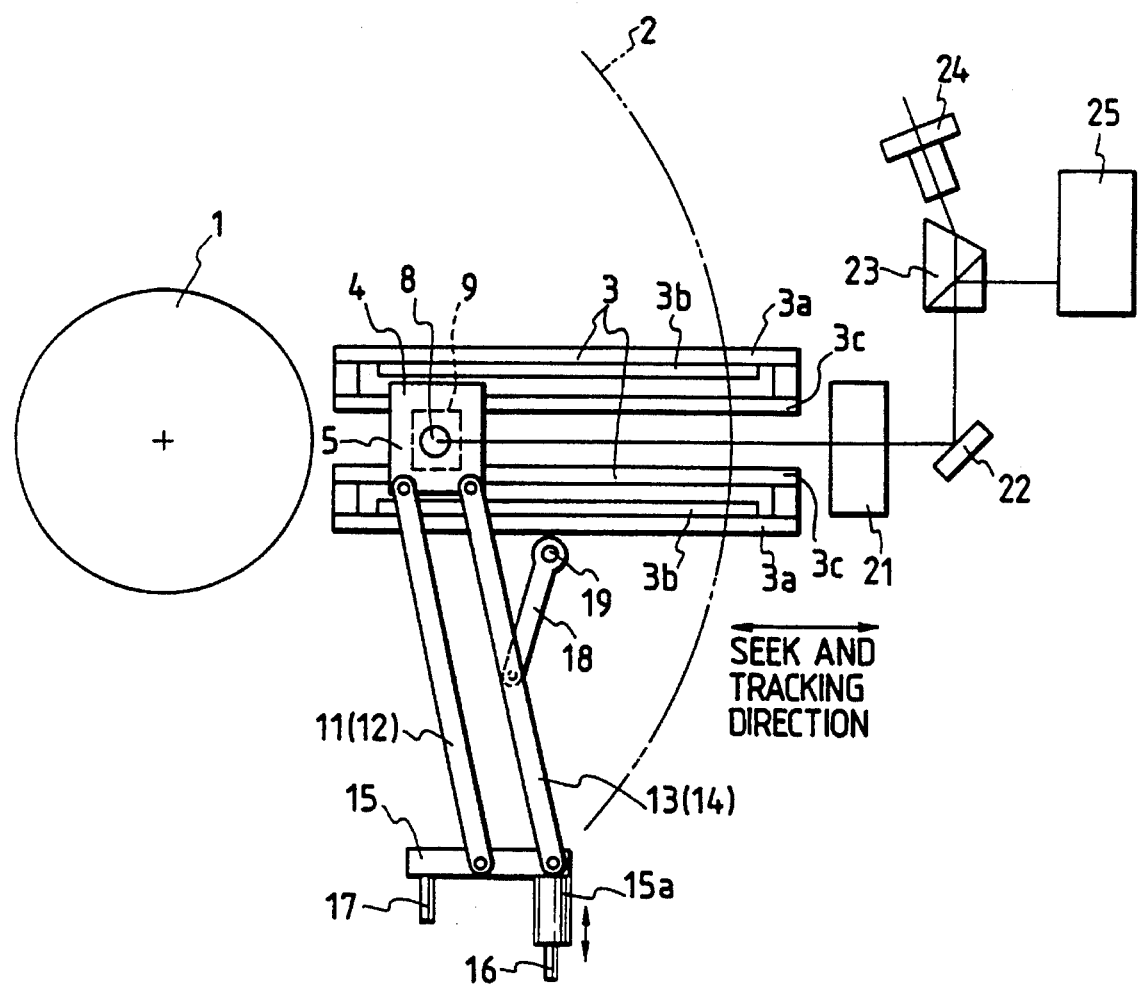
FIG. 1 is a plan view illustrating an optical disk device according to the present invention.
Figure 2:
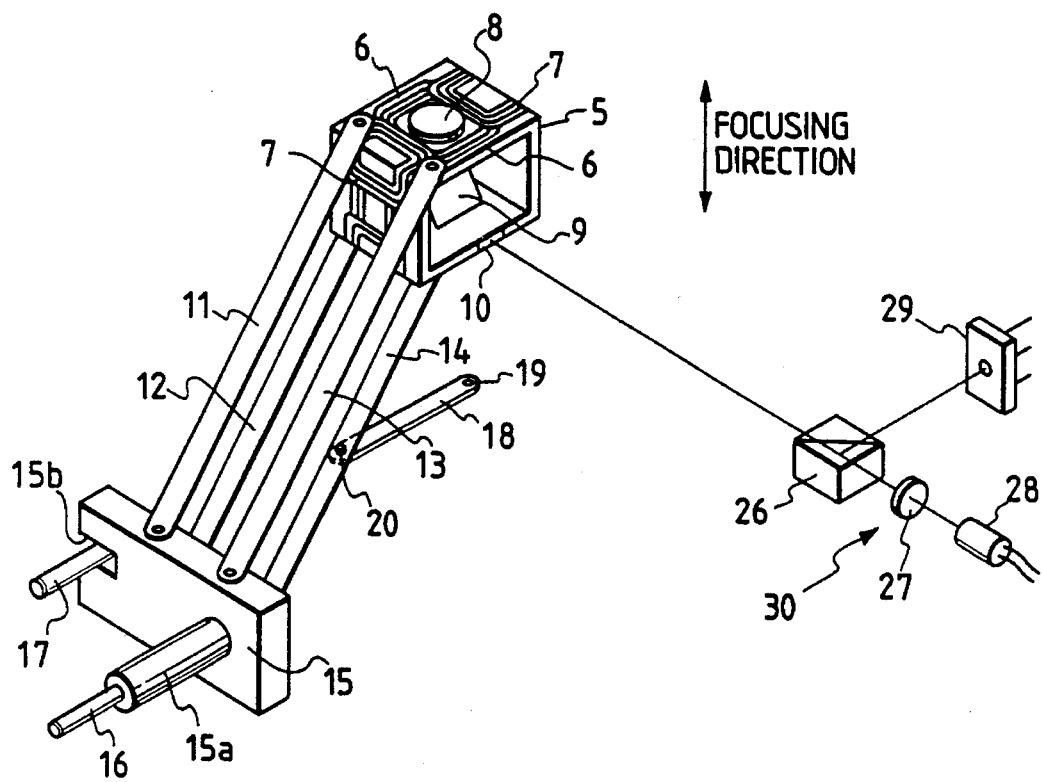
FIG. 2 is a perspective view fully depicting a lens actuator in the device illustrated in FIG. 1.

FIG. 1 is a plan view illustrating an optical disk device according to the present invention. FIG. 2 is a perspective view illustrating a lens actuator depicted in FIG. 1. Designated at 1 is a spindle motor for rotating a disk 2. Disposed on a device mount sideways of the spindle motor 1 is a magnetic field applying unit 3 extending in a tracking direction of the disk and consisting of an outer yoke 3a, a permanent magnet 3b confronting the outer yoke and an inner yoke 3c disposed at a predetermined spacing from the permanent magnet. The lens actuator 4 conceived as a movable optical head of the present invention is composed in: an angular cylindrical base frame 5 penetrating the inner yoke 3c; tracking coils 6 (wound on an outer periphery of the base frame 5) attached to the base frame 5; four lengths of rectangular focus coils 7; an objective lens 8 fixed to an upper central part thereof; an optical path diverting mirror 9 fixed inwardly of the frame; and a reflection member 10 consisting of a mirror or the like provided on the end surface of the base frame 5. Note that the tracking coils 6 and the focus coils 7 are attached to the base frame 5 so that at least a part of these coils enter a magnetic field generated between the permanent magnet 3b and the inner yoke 3c. Besides, the base frame 5 is reciprocatively movable in the tracking direction along the inner yoke 3c. This lens actuator 4 is sustained in a suspending state from the device mount by means of levers 11, 12 13, 14 combined to constitute a parallel link mechanism. The actuator 4 is bendable in up-and-down directions (focusing direction) during a focusing operation. A cylindrical portion 15a is provided on one side of a support member 15 for supporting proximal portions of the levers 11 through 14. The support member 15 is slidable along a guide shaft 16 fitted to the cylindrical portion 15a. Further, a notch 15b engaging with a whirl-stop pin 17 is provided on the other side of the support member 15, thereby preventing the support member 15 from rotating about the guide shaft 16. Note that the guide shaft 16 and the whirl-stop pin 17 are parallel to a recording surface of the disk 2 mounted on the spindle motor, extend in a direction orthogonal to the tracking direction and are fixed to the device mount.

Furthermore, when the lens actuator 4 moves from an inner periphery to an outer periphery of the disk 2, a rectilinear approximation mechanism is constructed by incorporating an oscillation lever 18 into a part of the parallel link mechanism with the intention of preventing the parallel link mechanism from making a circular motion. A proximal portion of the oscillation lever 18 is so supported on a pivot 19 as to be rotatable with respect to the device mount, and a top end thereof is rotatably linked to a middle part of the lever 14 with a pin 20. The oscillation lever 18, the lever 14 and the support member 15 are combined to constitute a single rectilinear approximation mechanism. Further, electric wires for charging the tracking coils 6 and the focus coils 7 on the lens actuator 4 with electricity are, though the illustration is omitted, arranged over the levers 11 to 14 for eliminating adverse influences in terms of operation. Besides, a fixed optical head fixed to the device mount is provided in an incident direction of the diverting mirror 9 of the lens actuator 4. Disposed sequentially in an interior thereof are a laser optical axis displacement mechanism 21, a mirror 22, a prism 23 including a half-mirror and a laser light source 24. A sensor unit including a servo sensor and an RF sensor is provided sideways of the prism 23. Further, a half-mirror 26, a lens 27 and a light emitting element 28 are disposed in a reflective direction of the reflection member 10. A position sensor (split sensor) 29 is provided in the reflective direction of the half-mirror 26. These components are combined to construct a focus position detecting mechanism 30.

A laser beam emitted from the laser light source 24 is incident on the diverting mirror 9 of the lens actuator 4 via the prism 23, the mirror 22 and the laser optical axis displacement mechanism 21. The laser beam is reflected by this mirror, and thereafter is focused on the disk 2 through the objective lens 8. Besides, a return laser beam reflected by the disk 2 is further reflected by the prism 23 via the objective lens 8 and the diverting mirror 9 and thereafter enters the sensor unit 25, wherein a tracking signal and a focusing signal are generated by the servo sensor.

When moving the lens actuator 4 in the tracking direction in response to the tracking signal, a control current based on the tracking signal flows in the tracking coils 6, thereby giving the driving force to the lens actuator 4. The lens actuator 4 is movable rectilinearly in the linear motor 3 by the rectilinear approximation mechanism constructed of the oscillation lever 18, the lever 14 and the support member 15. The lens actuator 4 is capable of maintaining the parallelism with the aid of the parallel link mechanism comprised of the levers 11 through 14. Besides, when moving the lens actuator 4 in the focusing direction in response to the focusing signal, the control current based on the focusing signal flows in the focusing coils 7, thereby giving a driving force to the lens actuator 4. The lens actuator 4 is thus moved. Note that a moving distance in the focusing direction is small, and hence a follow-up can be effected owing to elastic deformations of the levers 11, 12, 13, 14 during this movement.

The following is an arrangement of the focus position detecting mechanism 30. When the lens actuator 4 performs a focusing operation in the up-and-down directions, the light from the light emitting element 28 falls on the reflection member 10 of the lens actuator 4 via the lens 27 and the half-mirror 26. The reflected light thereof is further reflected by the half-mirror 26 and led to the position sensor 29. A light spot position on the position sensor 29 changes depending on the position of the actuator 4. Vertical positions of the lens actuator 4 are thus detected by utilizing the above-mentioned changes.

Figure 3:
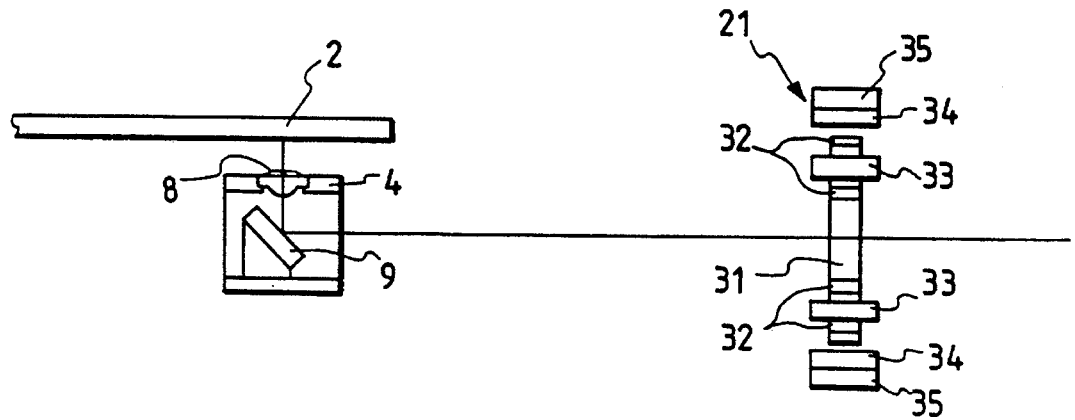
FIG. 3 is a sectional view showing a laser optical axis displacement mechanism.
Figure 4:
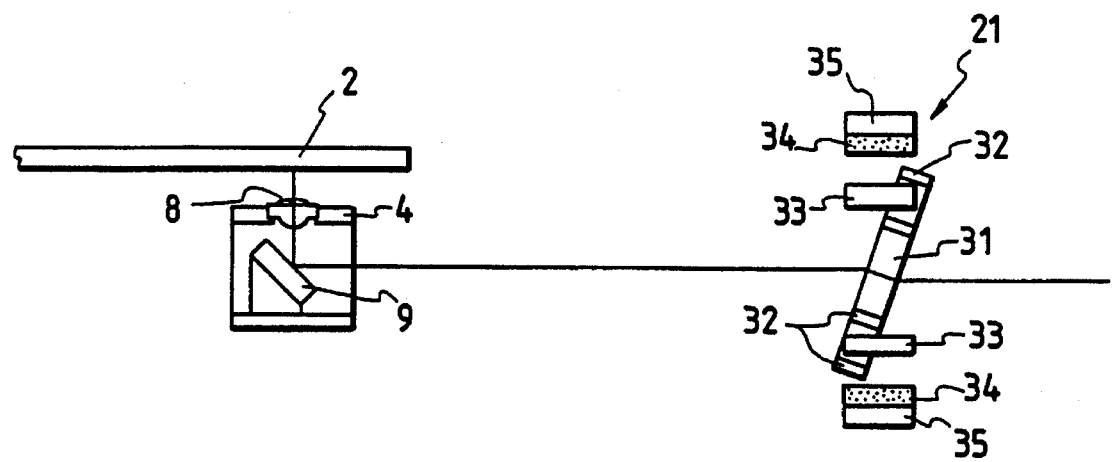
FIG. 4 is a view for explaining the operation of the mechanism shown in FIG. 3.

FIG. 3 is a block diagram of the laser optical axis displacement mechanism 21. FIG. 4 is a diagram for in explaining its operation. This laser optical axis displacement mechanism 21 is intended to prevent the diverting mirror 9 from deviating from the optical axis of the laser beam when the lens actuator 4 moves up-and-down due to the focusing operation. In the laser optical axis displacement mechanism 21, coils 32 are attached to up-and-down ends of a parallel plate glass 31. When the current flows in the coils 32, the current runs in a direction orthogonal to a magnetic field generated by an inner yoke 33, a magnet 34 and an outer yoke 35. Generated is a force for rotating the parallel plate glass 31 in the vertical directions. Utilizing this phenomenon, the parallel plate glass 31 is rotated from a state shown in FIG. 3 to a state shown in FIG. 4. Thus, the laser beam is refracted in accordance with the rotation of the parallel plate glass 31, and a height of the optical axis at the emission of the parallel plate glass 31 moves in parallel, and therefore the laser beam may be followed to the diverting mirror 9 of the lens actuator 4.

For example, on the occasion of focusing, the focus position detecting mechanism 30 detects the vertical positions of the lens actuator 4 in the manner described above. Using a control circuit depicted in FIG. 5, the laser optical axis can be compensated for by rotating the parallel plate glass 31 in accordance with a result of this detection.

The control circuit shown in FIG. 5 will be described in detail.

Figure 5:
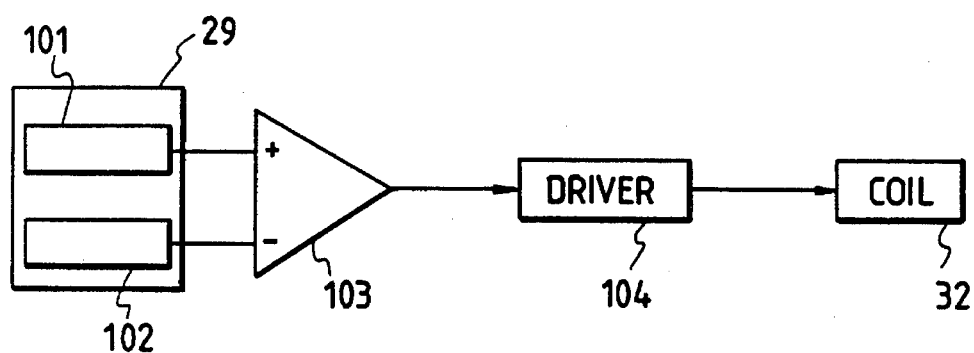
FIG. 5 is a control block diagram of the mechanism depicted in FIG. 3.

Referring to FIG. 5, the numerals 101, 102 denote split sensor regions within the position sensor 29. Designated at 103 is a differential amplifier for effecting difference calculation between output signals of the sensor regions 101, 102. A driver generally indicated at 104 serves to drive a coil 32 in the laser optical axis displacement mechanism on the basis of the output signal of the differential amplifier.

In the embodiment shown in FIG. 2, the light quantities of beams of reflected light which are respectively incident on the sensor regions 101, 102 within the position sensor 29 become different depending on the vertical positions of the lens actuator 4. Namely, to compensate for the difference therebetween, the optical axis of the laser beam is compensated for by driving the coil 32 of the laser optical axis displacement mechanism to move the parallel plate glass 31.

Figure 6:
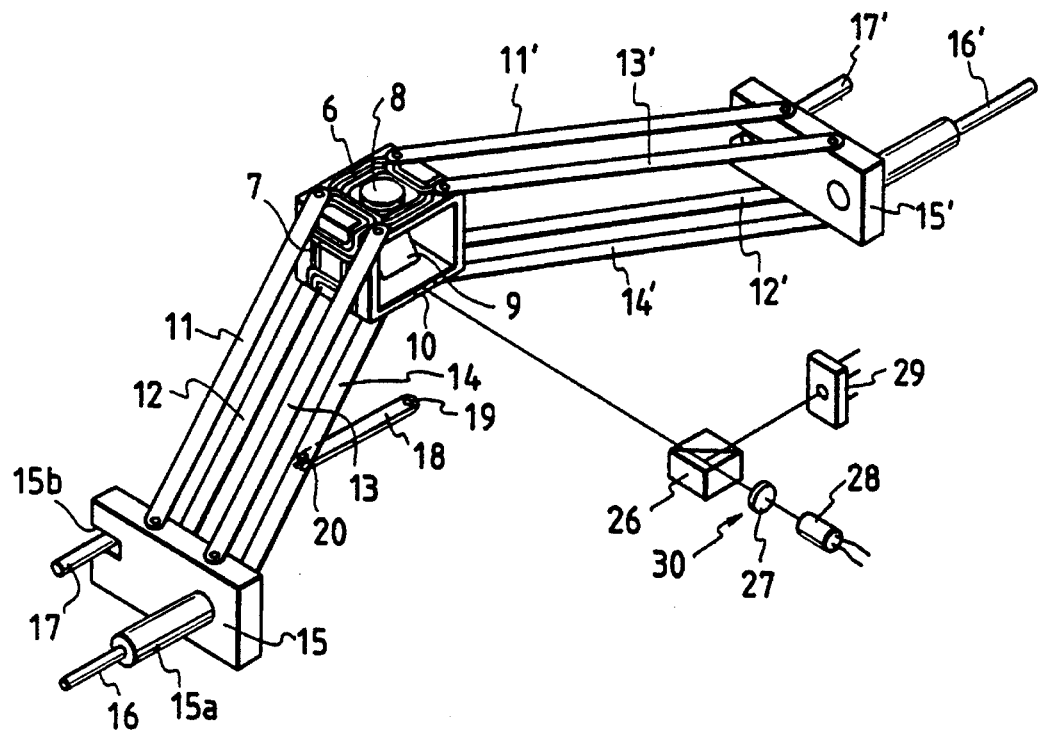
FIG. 6 is a perspective view showing another embodiment of the lens actuator illustrated in FIG. 2.

FIG. 6 illustrates another embodiment of the mechanism for supporting the lens actuator 4. Given therein is a case where parallel link mechanisms are provided in bisymmetry for restraining an inclination of the lens actuator 4 more surely. To be specific, a parallel link mechanism consisting of levers 11', 12', 13', 14' is provided in symmetry with respect to the parallel link mechanism comprised of the levers 11 through 14 with the lens actuator 4 being interposed therebetween. A support member 15' for supporting these levers 11' through 14', a guide shaft 16' and a whirl-stop pin 17' are provided absolutely in symmetry with respect to the support member 15, the guide shaft 16 and the whirl-stop pin 17.

When the parallel link mechanism for supporting the lens actuator 4 is provided in bisymmetry as described above, the inclination of the lens actuator 4 can be regulated more surely. Hence, the operation of the lens actuator 4 becomes more accurate.

Figure 7:
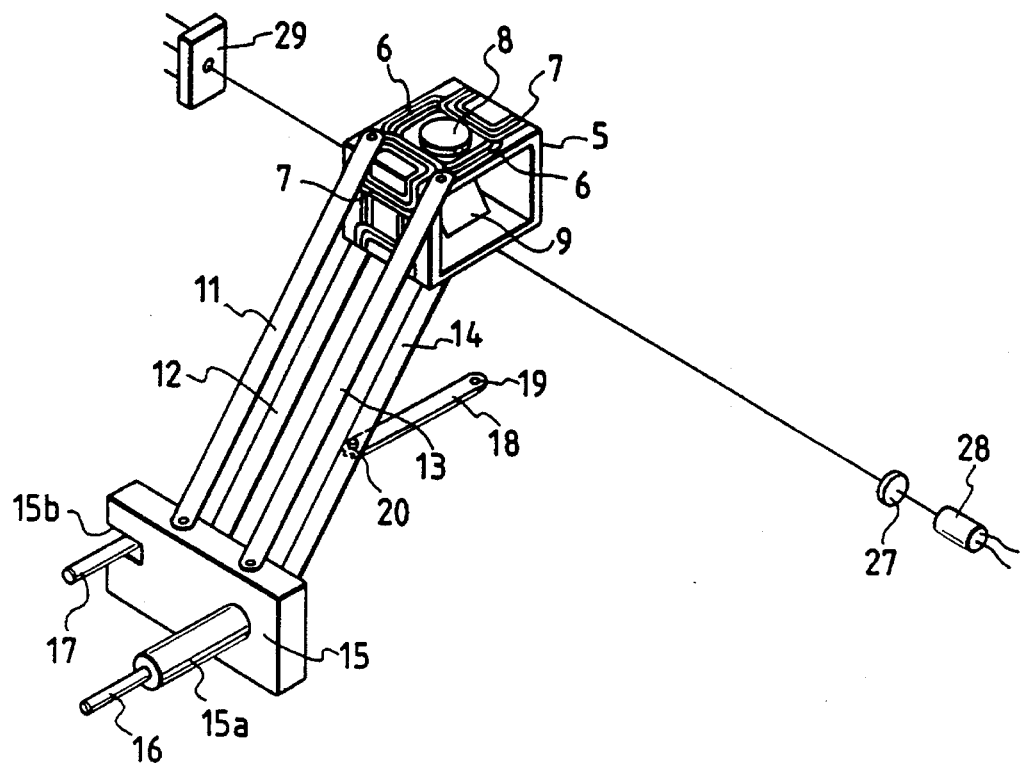
FIG. 7 is a perspective view illustrating a focus position detecting mechanism shown in FIG. 2.

Further, FIG. 7 illustrates an embodiment of a light transmissive type mechanism in another embodiment of the focus position detecting mechanism 30. A light emitting element 28 and a lens 27 are disposed substantially in the same positions as those in the focus position detecting mechanism of FIG. 2. A position sensor 29 is provided with the lens actuator 4 being interposed therebetween.

A luminous flux emitted from the light emitting element 28 penetrates the lens 27 and reaches the position sensor 29 while a part of the light flux is eclipsed by the lens actuator 4. When the lens actuator 4 moves up and down, the eclipse of the laser beam varies, and the quantity of light which reaches the position sensor 29 also changes. It is therefore possible to detect the vertical position of the lens actuator 4 from an output of the position sensor 29.

Figure 8:
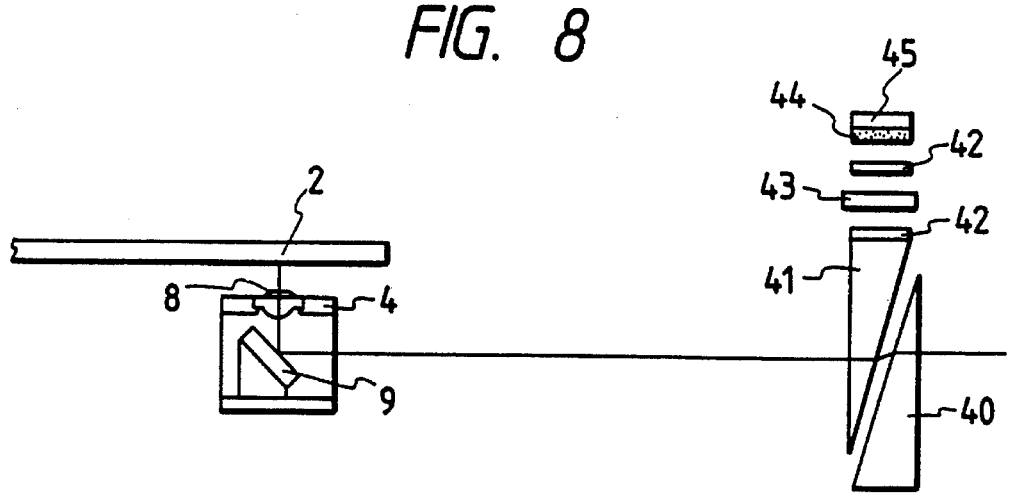
FIG. 8 is a sectional view showing the laser optical axis displacement mechanism illustrated in FIG. 3.

Further, FIG. 8 is a block diagram, showing another embodiment of the laser optical axis displacement mechanism 21, for in explaining the operation. In this laser optical axis displacement mechanism 21, a wedge-like fixed prism 40 is disposed on the optical path. A movable prism 42 is disposed in axial symmetry with respect to this fixed prism 40. A drive coil 41 is secured to an upper part of the movable prism 42. Provided are an inner yoke 43, a magnet 44 and an outer yoke 45 which move the movable prism 42.

Figure 9:
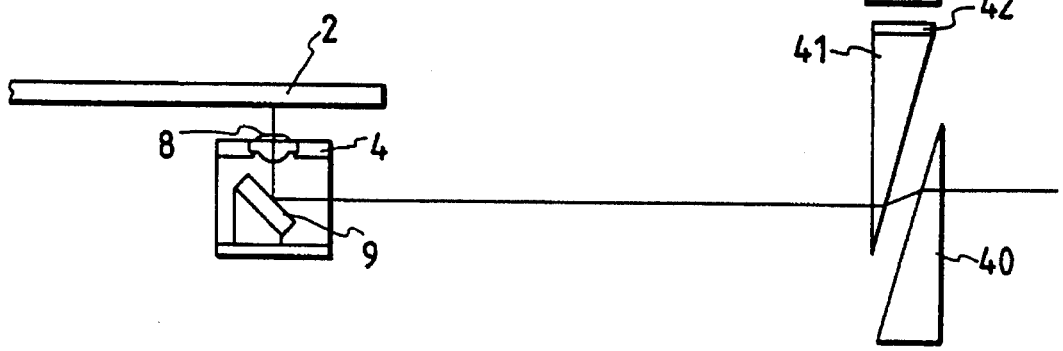
FIG. 9 is a view for explaining the operation of the mechanism depicted in FIG. 8.

When electrifying the coil 41, the movable prism 42 is, as in a state of FIG. 9, driven in a direction orthogonal to the optical axis. A spacing between the two prisms 40, 42 is thereby changed, and a vertical displacement of the optical axis of the laser beam is caused.

Next, another embodiment of the movable optical head will be explained with reference to FIGS. 10 and 11. The same components as those shown in the previous Figures are marked with like numerals, and explanation thereof will be omitted.

Figure 10:
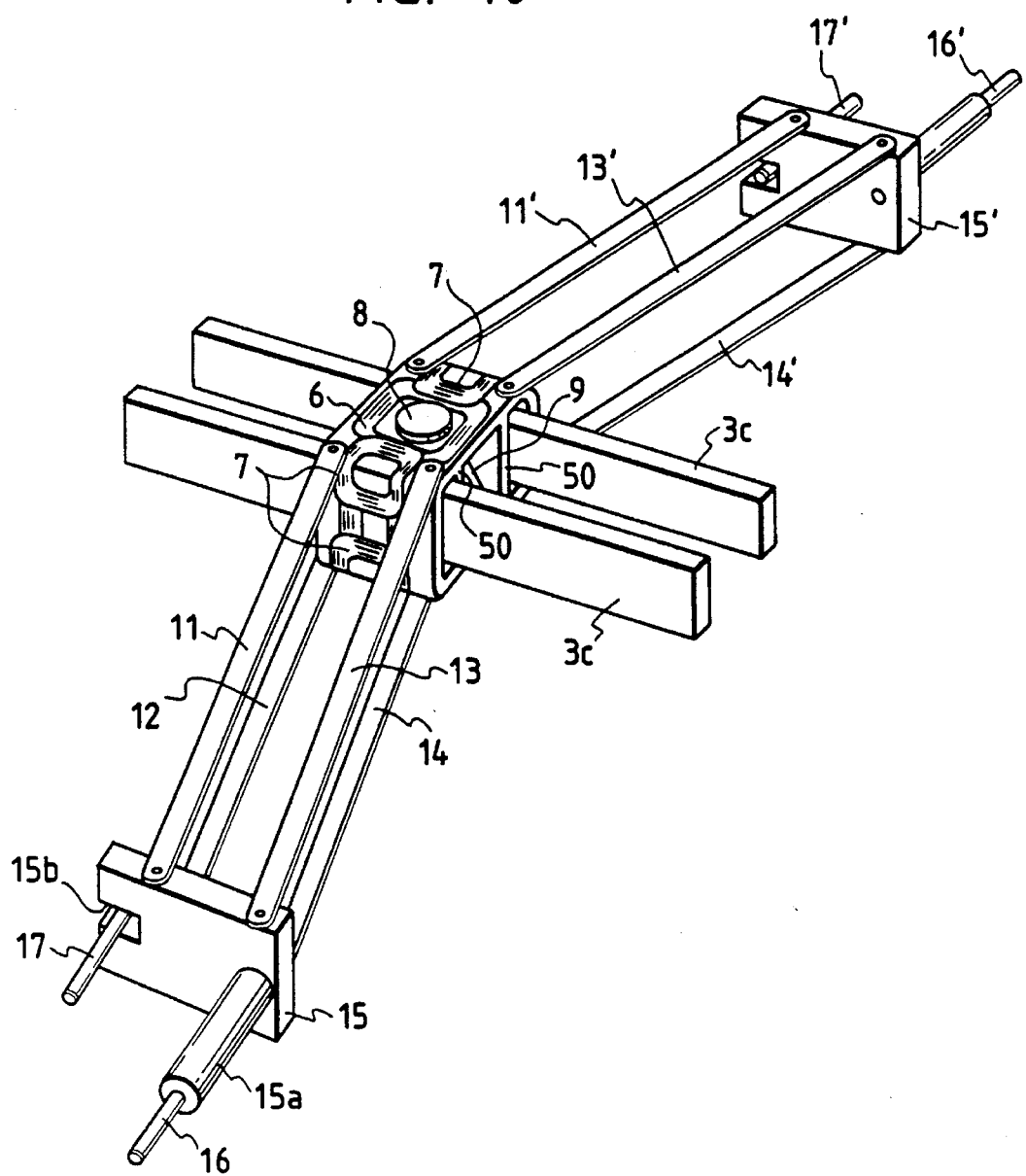
FIG. 10 is a perspective view showing still another embodiment of the lens actuator illustrated in FIG. 2.
Figure 11:
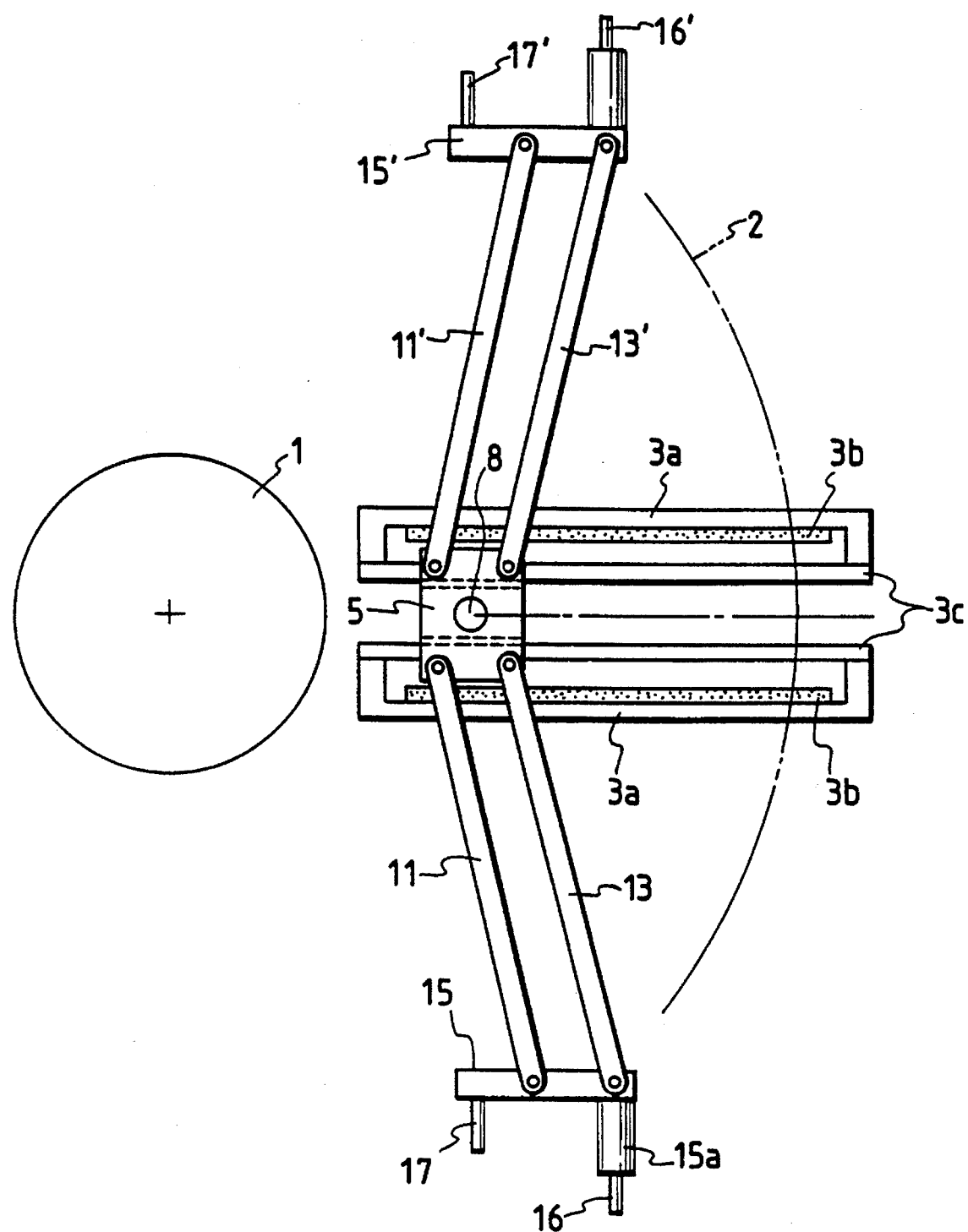
FIG. 11 is a plan view of the lens actuator illustrated in FIG. 10.

FIG. 10 is a perspective view. FIG. 11 is a plan view.

A difference from the movable optical head shown in FIG. 6 is a structure of the base frame 5 of the lens actuator 4.

Based on the construction of this embodiment, two walls 50 extending in the vertical directions are formed within the base frame 5. Each wall slidably contacts an inside surface of the inner yoke 3c. However, the inside surface of the inner yoke 3c is a plane including the tracking direction and the optical axial direction (focusing direction) of the objective lens 8. The above-mentioned wall 50 is higher than a height of the inner yoke 3c. Therefore, the base frame 5 is movable in the focusing direction with respect to the inner yoke 3c while the wall 50 keeps the slidable contact state with the inner yoke 3c.

A guide accuracy in the seek and tracking directions can be enhanced taking the above-described construction.

Moreover, still another embodiment of the movable optical head of the present invention will be described with reference to FIGS. 12 and 13.

The same components as those shown in the previous Figures are marked with the like numerals, and the description thereof will be omitted.

Figure 12:
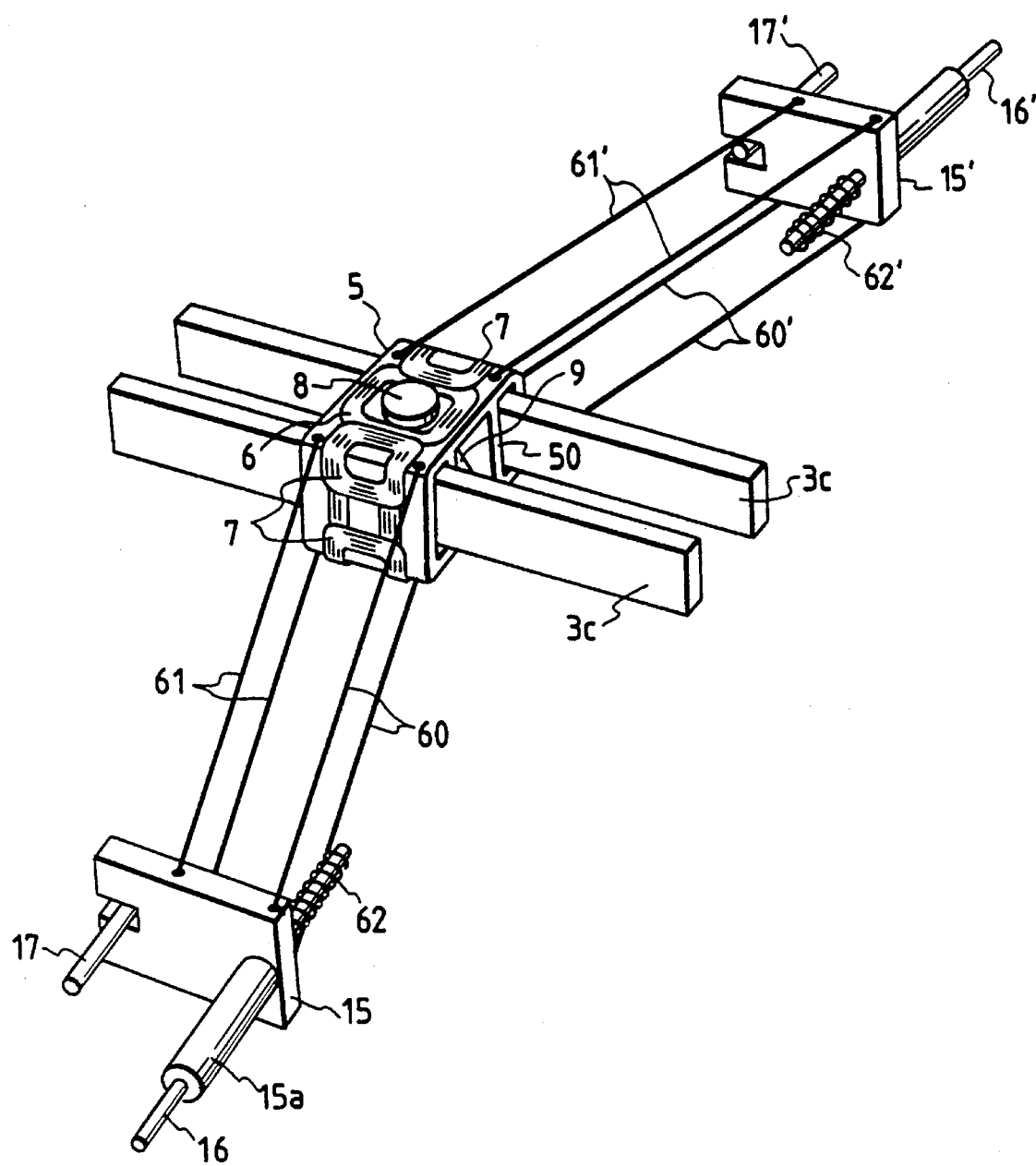
FIG. 12 is a perspective view showing a further embodiment of the lens actuator depicted in FIG. 2.
Figure 13:
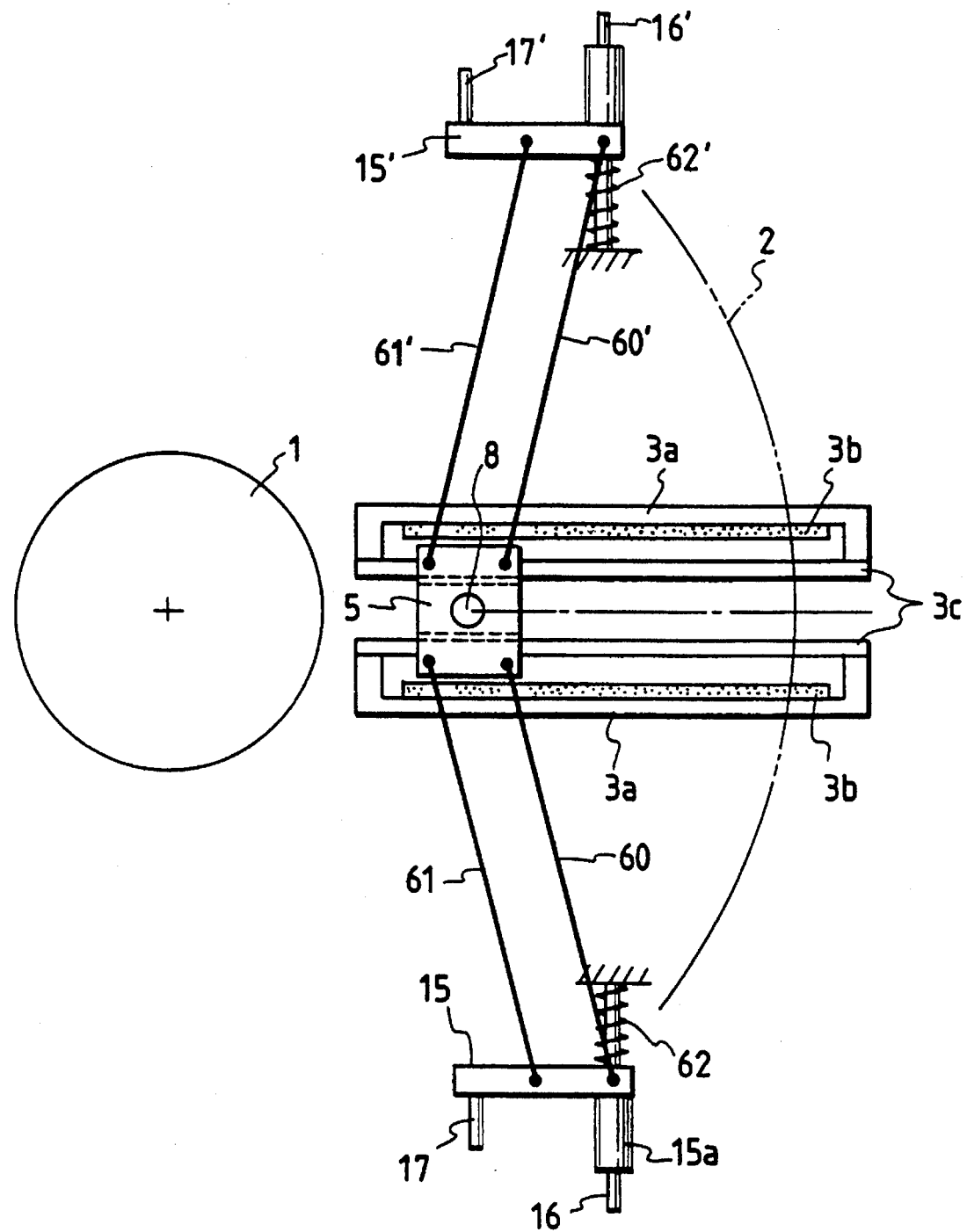
FIG. 13 is a plan view of the lens actuator depicted in FIG. 12.

FIG. 12 is a perspective view. FIG. 13 is a plan view.

The following are differences from the movable optical head depicted in FIG. 10. One difference is that a lever for supporting the lens actuator 4 is comprised of wires 60, 61, 60', 61' such as tungsten wire, for example. Another difference is that there are provided compression coil springs 62, 62' for urging the support member 15 in the direction for tensing up the wires 60, 61, 60', 61' so as not to cause flexures of the wires 60, 61, 60', 61'.

The compression coil springs 62, 62' are wound respectively on the guide shafts 16, 16'. Inside ends of the springs are secured to the unillustrated device body, while outside ends thereof urge the support member 15 outwards by an appropriate force. Hence, the stretching forces always act on the wires 60, 61, 60', 61'.

In accordance with this embodiment, the lens actuator 4 is supported on the device mount by use of the wires. The weight can be further reduced. The wires have no elasticity in the compressive direction. Hence, there is an advantage in that oscillations are caused only with difficulty.

Although the illustrative embodiments of the present invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. An optical disk device for effecting at least one of recording of information on and reproduction of information from a recording medium by use of a light beam emitted from a light source, said disk device comprising:

a light source for generating a light beam to irradiate the recording medium, said light source being immovable with respect to a device mount;

an objective lens for focusing the light beam from said light source onto the recording medium to effect at least one of recording of information on and reproduction of information from the recording medium;

a box body for holding said objective lens;

a support member for supporting said box body to be movable with respect to said device mount in tracking, focusing and seek directions;

a mirror, provided in said box body, for guiding the light beam from said light source to said objective lens;

detecting means for detecting a displacement of said box body in a focusing direction of the light beam with respect to the device mount; and an optical axis displacement mechanism for causing displacement of an optical axis of the light beam on the basis of a detection by said detecting means.

2. An optical disk device according to claim 1, wherein said detecting means comprises a reflection plate provided on said box body, a light source for emitting a detection light beam onto said reflection plate and a reflected light detector for detecting light reflected from said reflection plate.

3. An optical disk device according to claim 1, wherein said detecting means comprises a detection light source for emitting a detection light beam, which is provided opposite to said detecting means with said box body being interposed therebetween and a transmitted light detector for detecting the detection light beam which is not blocked by said box body.

4. An optical disk device according to claim 1, wherein said optical axis displacement mechanism comprises a parallel glass disposed within an optical path of the detection light beam and control means for controlling inclination of said parallel glass on the basis of a detection by said detecting means.

5. An optical disk device according to claim 1, wherein said optical axis displacement mechanism comprises two wedge-like prisms disposed within the optical path of the detection light beam and control means for changing a relative position of said wedge-like prisms on the basis of a detection by said detecting means.

* * * * *

UNITED STATES PATENT AND TRADEMARK OFFICE
CERTIFICATE OF CORRECTION

PATENT NO. : 5,553,053
DATED : September 3, 1996
INVENTOR(S) : NOBUAKI DATE

It is certified that error appears in the above-indentified patent and that said Letters Patent is hereby corrected as shown below:

ON THE COVER PAGE:

Under "FOREIGN PATENT DOCUMENTS," item [56]

"362333 3/1981 Japan" should read --3-62333 3/1991 Japan--;

"258735  2/1990 Japan
2301029 12/1990 Japan" should read
--2-58735  2/1990 Japan
2-301029 12/1990 Japan--

IN THE ABSTRACT: item [57]

Line 6, "Light" should read --A light--.

UNITED STATES PATENT AND TRADEMARK OFFICE
CERTIFICATE OF CORRECTION

PATENT NO. : 5,553,053
DATED : September 3, 1996
INVENTOR(S) : NOBUAKI DATE

It is certified that error appears in the above-indentified patent and that said Letters Patent is hereby corrected as shown below:

COLUMN 1:

Line 26, "such" should be deleted.

COLUMN 2:

Line 34, "showing-another" should read --showing another--.

COLUMN 3:

Line 1, "of" should read --in-- and "is composed" should be deleted;
Line 2, "in:" should read --comprises:--.

UNITED STATES PATENT AND TRADEMARK OFFICE
CERTIFICATE OF CORRECTION

PATENT NO. : 5,553,053  Page 3 of 3
DATED : September 3, 1996
INVENTOR(S) : NOBUAKI DATE It is certified that error appears in the above-indentified patent and that said Letters Patent is hereby corrected as shown below:

COLUMN 4:

Line 31, "in" should be deleted.

COLUMN 6:

Line 14, "the" (both occurrences) should be deleted.

Signed and Sealed this

Eleventh Day of February, 1997

Attest:

BRUCE LEHMAN

Attesting Officer          Commissioner of Patents and Trademarks